(12) United States Patent
Gao et al.

(10) Patent No.: US 9,900,107 B1
(45) Date of Patent: Feb. 20, 2018

(54) COHERENT RECEIVER, METHOD, AND SYSTEM FOR COHERENT LIGHT SOURCE FREQUENCY OFFSET ESTIMATION AND COMPENSATION

(71) Applicant: Huawei Technologies Co., Ltd., Shenzhen, Guangdong (CN)

(72) Inventors: Lei Gao, Shenzhen (CN); Yin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/728,279

(22) Filed: Oct. 9, 2017

Related U.S. Application Data

(63) Continuation of application No. PCT/CN2015/076338, filed on Apr. 10, 2015.

(51) Int. Cl.
*H04B 10/00* (2013.01)
*H04B 10/61* (2013.01)

(52) U.S. Cl.
CPC .............. *H04B 10/6164* (2013.01)

(58) Field of Classification Search
CPC  H04B 10/615; H04B 10/6151; H04B 10/616; H04B 10/6161; H04B 10/6162; H04B 10/6163; H04B 10/6164; H04B 10/6165; H04B 10/6166
USPC .................................................. 398/208–214
See application file for complete search history.

(56) References Cited

U.S. PATENT DOCUMENTS

| | | | | |
|---|---|---|---|---|
| 5,115,332 A | * | 5/1992 | Naito ................. | H04B 10/2513 398/202 |
| 5,684,836 A | * | 11/1997 | Nagayasu ................ | H03J 7/02 329/307 |
| 7,899,340 B1 | * | 3/2011 | Bontu .................... | H04B 10/60 398/203 |
| 8,630,551 B2 | * | 1/2014 | Margraf ................ | G01M 11/00 398/204 |
| 8,660,438 B2 | * | 2/2014 | Nakashima .......... | H04B 10/611 398/202 |
| 8,670,679 B2 | * | 3/2014 | Chung ................ | H04B 10/614 398/202 |

(Continued)

FOREIGN PATENT DOCUMENTS

| | | |
|---|---|---|
| CN | 1497247 A | 5/2004 |
| CN | 101753252 A | 6/2010 |
| CN | 104009807 A | 8/2014 |

*Primary Examiner* — Amritbir Sandhu (57) ABSTRACT

Embodiments of the present disclosure disclose a coherent receiver, including: a frequency offset estimation unit and a frequency offset compensation unit, where the frequency offset estimation unit is configured to receive signal light and local oscillator light, where the signal light is received by a first photoelectric detector, and a first intensity value is obtained, the signal light is received by a second photoelectric detector, and a second intensity value is obtained, the local oscillator light is received by a third photoelectric detector, and a third intensity value is obtained, and the local oscillator light is received by a fourth photoelectric detector, and a fourth intensity value is obtained; and the frequency offset compensation unit is configured to obtain a frequency offset value between the signal light and the local oscillator light according to a difference between a first ratio and a second ratio.

11 Claims, 5 Drawing Sheets

(56) References Cited

U.S. PATENT DOCUMENTS

| | | | | |
|---|---|---|---|---|
| 8,750,717 B1* | 6/2014 | Yap | G02F 2/02 | |
| | | | 398/158 | |
| 9,014,317 B2* | 4/2015 | Cai | H04B 1/1027 | |
| | | | 375/347 | |
| 9,203,508 B2* | 12/2015 | Hauske | H04B 10/07 | |
| 9,231,787 B1* | 1/2016 | Zamani | H04L 27/0014 | |
| 9,379,820 B2* | 6/2016 | Huang | H04B 10/60 | |
| 9,401,765 B2* | 7/2016 | Kawasoe | H04B 10/6165 | |
| 9,444,664 B2* | 9/2016 | Chen | H04L 25/0202 | |
| 9,525,494 B2* | 12/2016 | Ogiwara | H04B 10/6164 | |
| 9,531,480 B2* | 12/2016 | Xie | H04B 10/616 | |
| 9,621,278 B2* | 4/2017 | Hosokawa | H04B 10/6164 | |
| 9,628,316 B2* | 4/2017 | Yi | H04L 27/26 | |
| 9,712,370 B2* | 7/2017 | Yun | H04L 27/3863 | |
| 9,755,820 B2* | 9/2017 | Liu | H04J 3/0691 | |
| 9,806,806 B1* | 10/2017 | Rohde | H04B 10/07955 | |
| 2004/0071472 A1* | 4/2004 | Ito | G01J 5/0806 | |
| | | | 398/161 | |
| 2004/0208643 A1* | 10/2004 | Roberts | H04B 10/61 | |
| | | | 398/186 | |
| 2009/0080906 A1* | 3/2009 | Tao | H04B 10/61 | |
| | | | 398/209 | |
| 2009/0129787 A1* | 5/2009 | Li | H04B 10/61 | |
| | | | 398/208 | |
| 2009/0142076 A1* | 6/2009 | Li | H04B 10/61 | |
| | | | 398/208 | |
| 2009/0245815 A1* | 10/2009 | Zhang | H04B 10/61 | |
| | | | 398/208 | |
| 2009/0305642 A1* | 12/2009 | Ezaki | G01S 11/10 | |
| | | | 455/67.13 | |
| 2010/0034537 A1* | 2/2010 | Zhang | H04B 10/5053 | |
| | | | 398/65 | |
| 2010/0080564 A1* | 4/2010 | Fujii | H04B 10/60 | |
| | | | 398/115 | |
| 2010/0111544 A1* | 5/2010 | Oda | H04B 10/60 | |
| | | | 398/204 | |
| 2010/0189445 A1* | 7/2010 | Nakashima | H04B 10/60 | |
| | | | 398/152 | |
| 2010/0232796 A1* | 9/2010 | Cai | H04B 10/677 | |
| | | | 398/79 | |
| 2010/0329677 A1* | 12/2010 | Kaneda | H04B 10/60 | |
| | | | 398/65 | |
| 2011/0064421 A1* | 3/2011 | Zhang | H04B 10/6161 | |
| | | | 398/208 | |
| 2011/0103529 A1* | 5/2011 | Kim | H04B 10/60 | |
| | | | 375/344 | |
| 2011/0286741 A1* | 11/2011 | Yan | H04B 10/60 | |
| | | | 398/34 | |
| 2012/0026860 A1* | 2/2012 | Yan | H04L 5/04 | |
| | | | 370/201 | |
| 2012/0170937 A1* | 7/2012 | Van Leeuwen | H04B 10/07957 | |
| | | | 398/76 | |
| 2012/0237204 A1* | 9/2012 | Zhou | H04B 10/0795 | |
| | | | 398/25 | |
| 2012/0308227 A1* | 12/2012 | Komaki | H04B 10/25073 | |
| | | | 398/25 | |
| 2013/0028595 A1* | 1/2013 | Nakagawa | H04L 27/2657 | |
| | | | 398/25 | |
| 2013/0045016 A1* | 2/2013 | Doran | H04B 10/50 | |
| | | | 398/214 | |
| 2013/0070874 A1* | 3/2013 | Nakagawa | H04B 7/10 | |
| | | | 375/323 | |
| 2013/0251369 A1* | 9/2013 | Ogasahara | H04B 10/614 | |
| | | | 398/65 | |
| 2013/0336665 A1* | 12/2013 | Suzuki | H04B 10/611 | |
| | | | 398/208 | |
| 2014/0286650 A1* | 9/2014 | Ogiwara | H04B 10/6164 | |
| | | | 398/208 | |
| 2014/0328588 A1* | 11/2014 | Sakai | H04B 10/6164 | |
| | | | 398/38 | |
| 2015/0063818 A1* | 3/2015 | Zhou | H04B 10/516 | |
| | | | 398/115 | |
| 2015/0098714 A1* | 4/2015 | Hatae | H04B 10/6164 | |
| | | | 398/208 | |
| 2015/0125150 A1* | 5/2015 | Sugitani | H04B 10/614 | |
| | | | 398/65 | |
| 2015/0147071 A1* | 5/2015 | Kawasoe | H04B 10/6164 | |
| | | | 398/202 | |
| 2015/0372766 A1* | 12/2015 | Yoshida | H04B 10/2507 | |
| | | | 398/193 | |
| 2016/0218887 A1* | 7/2016 | Zamani | H04L 25/024 | |
| 2016/0352432 A1* | 12/2016 | Jensen | H04B 10/612 | |
| 2017/0134112 A1* | 5/2017 | Inada | H04J 14/0227 | |
| 2017/0170937 A1* | 6/2017 | Chun | H04L 5/0048 | |
| 2017/0227969 A1* | 8/2017 | Murray | A01B 79/00 | |
| 2017/0310401 A1* | 10/2017 | Fludger | H04B 10/6164 | |

* cited by examiner

COHERENT RECEIVER, METHOD, AND SYSTEM FOR COHERENT LIGHT SOURCE FREQUENCY OFFSET ESTIMATION AND COMPENSATION

CROSS-REFERENCE TO RELATED APPLICATIONS

This application is a continuation of International Application No. PCT/CN2015/076338, filed on Apr. 10, 2015, the disclosure of which is hereby incorporated by reference in its entirety.

TECHNICAL FIELD

The present application relates to the field of optical communications, and in particular, to a coherent receiver, a method, and a system for coherent light source frequency offset estimation and compensation.

BACKGROUND

A direct detection receiving manner is used in conventional optical communications. However, as a communication capacity increases, a problem such as chromatic dispersion, frequency offset mode dispersion, a nonlinear effect, or phase noise occurs in a fiber link, and the conventional direct detection receiving manner is gradually replaced by an optical coherent detection technology.

Figure 1:
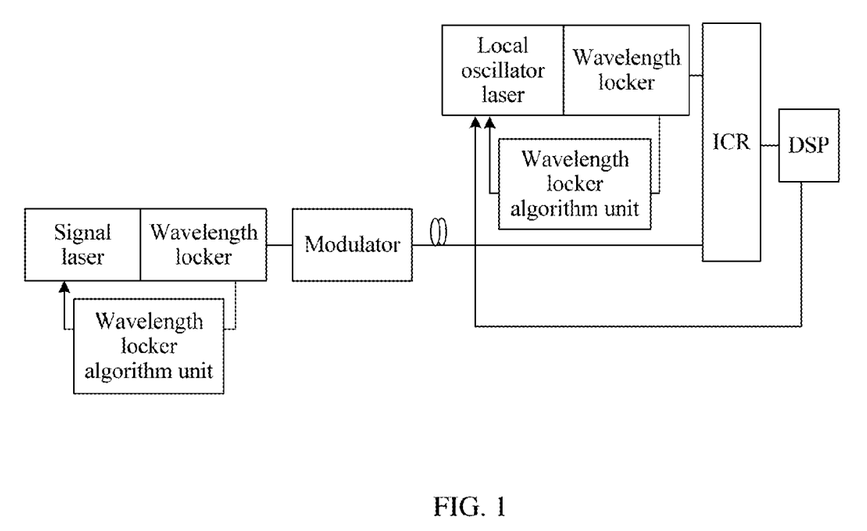
FIG. 1 is a schematic structural diagram of a coherent optical communications system in the prior art.

Because an optical coherent receiving manner may support multiple modulation formats, by taking full advantage of information about light, such as an amplitude, a phase, or polarization, spectrum utilization may be improved, and a fiber transmission capacity may be increased. FIG. 1 is a schematic structural diagram of a coherent optical communications system. In the coherent optical communications system, a signal laser at a transmit end generates signal light, and the signal light enters a receive end after being modulated by a modulator. A local oscillator laser at the receive end generates local oscillator light. Frequency mixing is performed on the signal light and the local oscillator light by using an Integrated Coherent Receiver (ICR). A frequency offset, between the signal light and the local oscillator light is compensated in an electric domain by using a Digital Signal Processor (DSP). Currently, a frequency offset compensation capability of a DSP in a coherent system is +/−5 GHz. Therefore, requirements of the coherent system for frequency stability of both the signal light and the local oscillator light are +/−2.5 GHz, and in addition, it is required that frequency offsets between wavelengths of the signal light and the local oscillator light and an International Telecommunication Union (ITU) standard wavelength are separately controlled within +/−2.5 GHz. The signal laser at the transmit end in the coherent system and the local oscillator laser at the receive end each include a wavelength locker. Feedback control from the wavelength locker and a wavelength locker algorithm unit ensures that the frequency offsets between the wavelengths of the signal light and the local oscillator light and the ITU standard wavelength are separately +/−2.5 GHz, that is, a frequency offset between the signal light and the local oscillator light is +/−5 GHz. This frequency offset value falls within a range of the compensation capability of the DSP.

However, due to its relatively high costs, the coherent optical communications mainly targets long-distance optical transmission. Therefore, costs of the coherent system need to be reduced, and the coherent system needs to be applied to a metropolitan area or an access domain. Respectively omitting the wavelength lockers in the lasers at the transmit end and the receive end may reduce the costs of the coherent system. Currently, there is a laser without a wavelength locker: a distributed feedback (DFB) laser. If the laser without a wavelength locker is used, wavelength control precision is generally +/−0.1 nm (frequency stability is +/−12.5 GHz), and a frequency offset between the signal light and the local oscillator light reaches +/−25 GHz. However, currently, the frequency offset compensation capability of the DSP in the coherent system is +/−5 GHz, and consequently, using a laser without a wavelength locker in the coherent system cannot implement frequency offset compensation.

SUMMARY

In view of this, embodiments of the present disclosure provide a coherent receiver, a method, and a system for coherent light source frequency offset estimation and compensation, so as to resolve a problem of frequency offset estimation and compensation in a coherent system when a low-cost laser without a wavelength locker is used as a light source.

According to a first aspect, an embodiment of the present disclosure provides a coherent receiver, including: a frequency offset estimation unit and a frequency offset compensation unit, where the frequency offset estimation unit is configured to receive signal light, where the signal light is received by a first photoelectric detector after passing through an etalon, and a first current intensity value is obtained; the signal light is received by a second photoelectric detector, and a second current intensity value is obtained, where the frequency offset estimation unit is further configured to receive local oscillator light, where the local oscillator light is received by a third photoelectric detector after passing through the etalon, and a third current intensity value is obtained, and the local oscillator light is received by a fourth photoelectric detector, and a fourth current intensity value is obtained; and the frequency offset compensation unit is configured to: obtain a first ratio according to a ratio of the first current intensity value to the second current intensity, obtain a second ratio according to a ratio of the third current intensity value to the fourth current intensity value, and obtain a frequency offset value between the signal light and the local oscillator light according to a difference between the first ratio and the second ratio, where the frequency offset value instructs to perform frequency offset compensation on the signal light and the local oscillator light.

According to a second aspect, an embodiment of the present disclosure provides a method for coherent light source frequency offset estimation and compensation, including: receiving, by a first photoelectric detector, signal light after the signal light passes through an etalon, and a first current intensity value is obtained; receiving, by a second photoelectric detector, the signal light, and a second current intensity value is obtained; receiving, by a third photoelectric detector, local oscillator light after the local oscillator light passes through the etalon, and a third current intensity value is obtained, and receiving, by a fourth photoelectric detector, the local oscillator light, and a fourth current intensity value is obtained; and obtaining a first ratio according to a ratio of the first current intensity value to the second current intensity, obtaining a second ratio according to a ratio of the third current intensity value to the fourth current intensity value, and obtaining a frequency offset value between the signal light and the local oscillator light according to a difference between the first ratio and the second ratio, where the frequency offset value instructs to perform frequency offset compensation on the signal light and the local oscillator light.

According to a third aspect, an embodiment of the present disclosure provides a coherent optical receiving system, where the system includes: a coherent transmitter and a coherent receiver, and the coherent receiver includes a frequency offset estimation unit and a frequency offset compensation unit, where the frequency offset estimation unit is configured to receive signal light, where the signal light is received by a first photoelectric detector after passing through an etalon, and a first current intensity value is obtained; the signal light is received by a second photoelectric detector, and a second current intensity value is obtained, where the frequency offset estimation unit is further configured to receive local oscillator light, where the local oscillator light is received by a third photoelectric detector after passing through the etalon, and a third current intensity value is obtained, and the local oscillator light is received by a fourth photoelectric detector, and a fourth current intensity value is obtained; and the frequency offset compensation unit is configured to: obtain a first ratio according to a ratio of the first current intensity value to the second current intensity, obtain a second ratio according to a ratio of the third current intensity value to the fourth current intensity value, and obtain a frequency offset value between the signal light and the local oscillator light according to a difference between the first ratio and the second ratio, where the frequency offset value instructs to perform frequency offset compensation on the signal light and the local oscillator light.

According to the technical solutions provided in the embodiments of the present disclosure, in a coherent receiver, signal light and local oscillator light pass through a frequency offset estimation unit, so that a feedback signal that reflects a frequency offset value between the signal light and the local oscillator light is obtained; a frequency offset compensation unit obtains the frequency offset value between the signal light and the local oscillator light according to the feedback signal, where the frequency offset value instructs to perform frequency offset compensation on the signal light and the local oscillator light, thereby implementing frequency offset estimation and compensation for signal light and local oscillator light in a coherent system when a laser without a wavelength locker is used as a light source of the signal light and the local oscillator light, and reducing costs of the coherent system.

BRIEF DESCRIPTION OF DRAWINGS

To describe the technical solutions in the embodiments of the present disclosure or in the prior art more clearly, the following briefly describes the accompanying drawings required for describing the background and the embodiments. Apparently, the accompanying drawings in the following description show merely some embodiments of the present disclosure, and a person of ordinary skill in the art may still derive other accompanying drawings or embodiments according to these drawings or description without creative efforts, and the present disclosure is intended to cover all these derived accompanying drawings or embodiments.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 2:
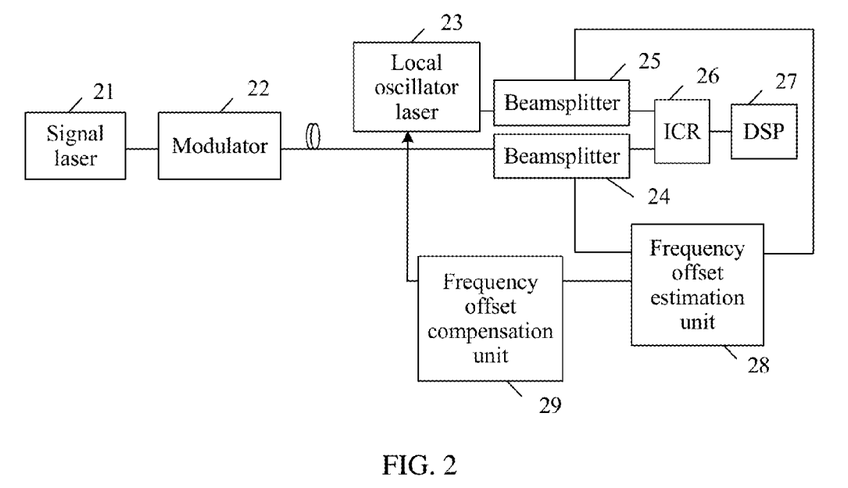
FIG. 2 is a schematic structural diagram of a coherent optical communications system used to implement an embodiment of the present disclosure.

The embodiments of the present disclosure propose a technical solution in which a low-cost laser without a wavelength locker is used as a light source in a coherent optical communications system. FIG. 2 is a schematic structural diagram of a coherent optical communications system according to an embodiment of the present disclosure. As shown in FIG. 2, the coherent optical communications system includes a transmit end and a receive end. The transmit end includes a signal laser 21 and a modulator 22. The receive end includes a coherent receiver, and specifically includes a local oscillator laser 23, a beamsplitter 24, a beamsplitter 25, an ICR 26, a DSP 27, a frequency offset estimation unit 28, and a frequency offset compensation unit 29. Specifically, the beamsplitter 24 and the beamsplitter 25 may be independent devices, or may be integrated into the frequency offset estimation unit 28. The frequency offset estimation unit 28 may be an independent module, or may be integrated into the ICR 26.

In a specific implementation process, the signal laser 21 at the transmit end and the local oscillator laser 22 at the receive end may not include a wavelength locker, and therefore may have an excessively large frequency offset range, for example, the frequency offset range reaches +/−12.5 GHz. The signal laser 21 at the transmit end generates signal light. The signal light is incident to a feeder fiber after being modulated by the modulator 22. The local oscillator laser 23 at the receive end generates local oscillator light. The signal light is split into two parts after passing through the beamsplitter 24 at the receive end. One part of the signal light enters the ICR 26, and the other part of the signal light enters the frequency offset estimation unit 28. The local oscillator light is split into two parts after passing through the beamsplitter 25 at the receive end. One part of the local oscillator light enters the ICR 26, and the other part of the local oscillator light enters the frequency offset estimation unit 28. The ICR 26 performs frequency mixing on the received signal light and local oscillator light.

A signal obtained after frequency mixing enters the DSP 27. The DSP 27 obtains phase information and light intensity information that are of the signal light after processing the signal obtained after frequency mixing, that is, the DSP 27 obtains, by means of demodulation, related information loaded by the modulator 22 at the receive end. After receiving the signal light and the local oscillator light, the frequency offset estimation unit 28 obtains, by means of detection, a feedback signal that reflects a frequency offset value between the signal light and the local oscillator light, and transmits the feedback signal to the frequency offset compensation unit 29. The frequency offset compensation unit 29 obtains the frequency offset value between the signal light and the local oscillator light according to the feedback signal, and generates a control signal according to the frequency offset value, so as to control the local oscillator laser 23 to perform wavelength adjustment, until the frequency offset value meets a system requirement.

Figure 4:
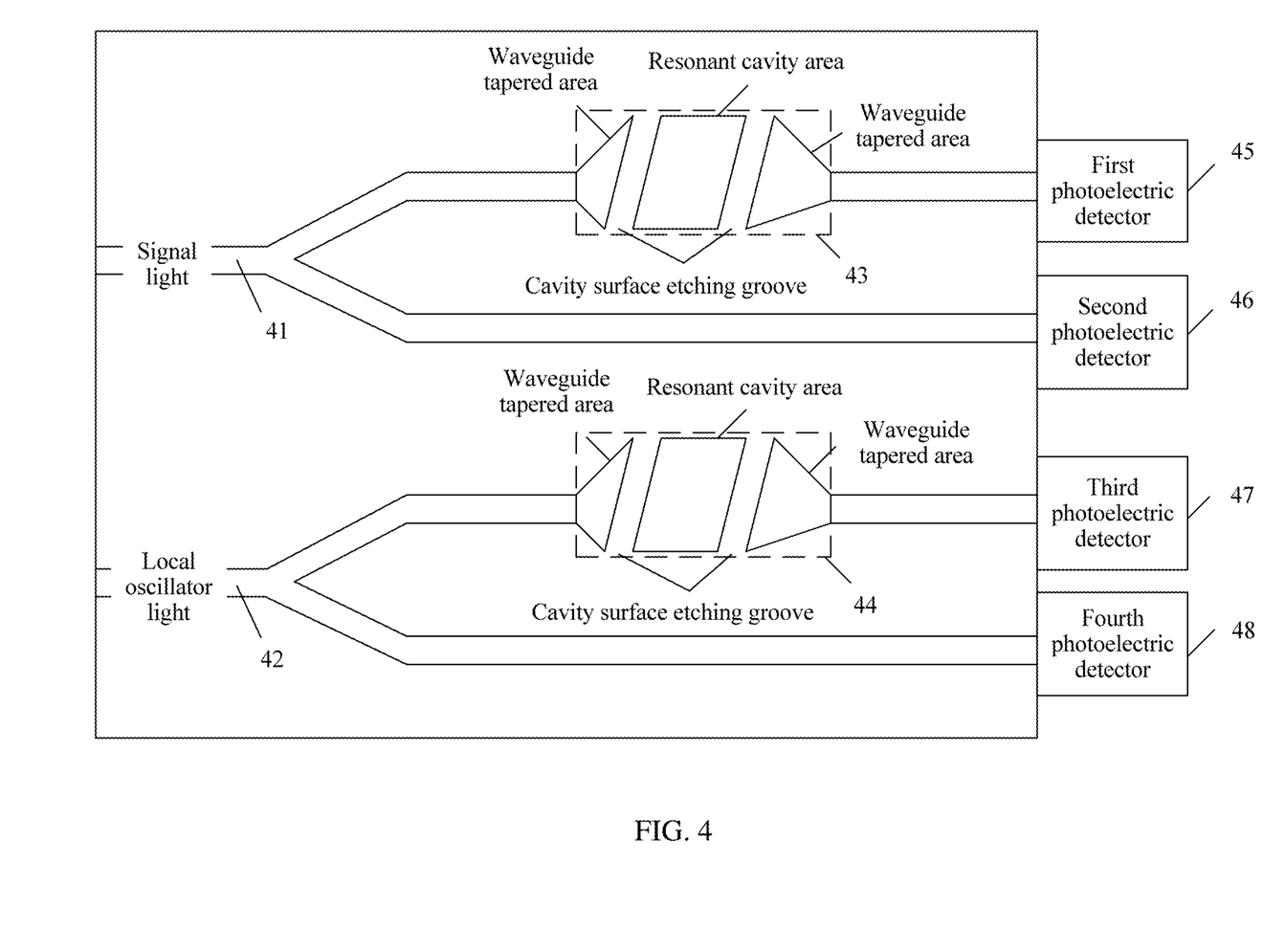
FIG. 4 is a schematic structural diagram of another frequency offset estimation unit used to implement an embodiment of the present disclosure.

In a specific implementation process, there may be two implementations for the frequency offset estimation unit 28. As shown in FIG. 4, a first implementation is implementing the operation of the frequency offset estimation unit in free space; and as shown in FIG. 5, a second implementation is implementing the operation of the frequency offset estimation unit by using a plane waveguide.

Figure 3:
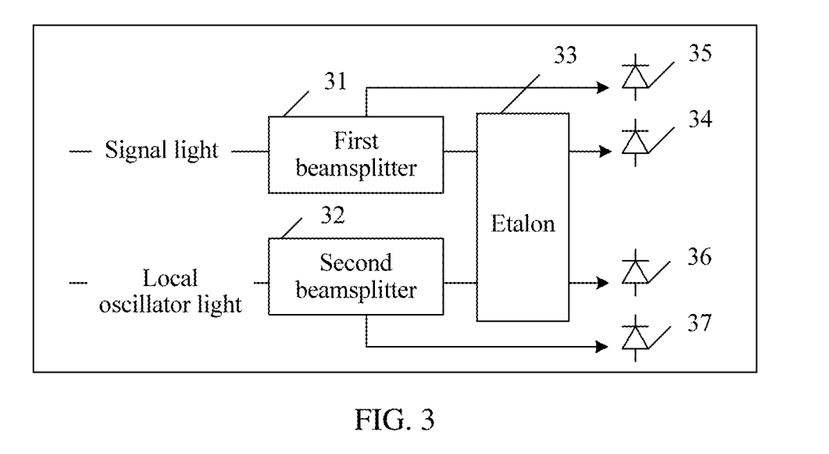
FIG. 3 is a schematic structural diagram of a frequency offset estimation unit used to implement an embodiment of the present disclosure.

FIG. 3 is a schematic structural diagram of a frequency offset estimation unit according to an embodiment of the present disclosure. A first implementation is implementing an operation of the frequency offset estimation unit in free space. The implementing an operation of the frequency offset estimation unit in free space means that light travels through air. The frequency offset estimation unit 28 includes a first beamsplitter 31, a second beamsplitter 32, an etalon 33, a first photoelectric detector 34, a second photoelectric detector 35, a third photoelectric detector 36, and a fourth photoelectric detector 37. Preferably, split ratios of the first beamsplitter 31 and the second beamsplitter 32 may be the same. The etalon 33 may be an air type etalon, and includes a pair of flat glass plated with a partially reflective film and a parallel spacing component. Incident light generates reflection on the two pieces of flat glass when the incident light is incident to the etalon, and therefore generates constructive (or destructive) interference. The first photoelectric detector 34, the second photoelectric detector 35, the third photoelectric detector 36, and the fourth photoelectric detector 37 have an optical-to-electrical conversion function, and may be specifically photodiodes or phototriodes. The signal light is split into two beams of light after passing through the first beamsplitter 31. The local oscillator light is split into two beams of light after passing through the second beamsplitter 32. One beam of the signal light is received by the first photoelectric detector 34 after passing through the etalon 33, and converted into an electrical signal, so that a current intensity value $I_{PD1}$ is obtained; and the other beam of the signal light is directly received by the second photoelectric detector 35, and converted into an electrical signal, so that a current intensity value $I_{PD2}$ is obtained. One beam of the local oscillator light is received by the third photoelectric detector 36 after passing through the etalon 33, and converted into an electrical signal, so that a current intensity value $I_{PD3}$ is obtained; and the other beam of the local oscillator light is directly received by the fourth photoelectric detector 37, and converted into an electrical signal, so that a current intensity value $I_{PD4}$ is obtained.

FIG. 4 is a schematic structural diagram of another frequency offset estimation unit according to an embodiment of the present disclosure. A second implementation is implementing an operation of the frequency offset estimation unit in a plane optical waveguide. The implementing an operation of the frequency offset estimation unit in a plane optical waveguide means that light is transmitted in optical waveguides located on a same plane. The frequency offset estimation unit 28 includes a first optical waveguide 41, a second optical waveguide 42, a first etalon function unit 43, a second etalon function unit 44, a first photoelectric detector 45, a second photoelectric detector 46, a third photoelectric detector 47, and a fourth photoelectric detector 48. The first etalon function unit 43 and the second etalon function unit 44 may be waveguide type etalons, and have functions and spectral transmission curves same as those of the etalon 33 in the embodiment shown in FIG. 3. Both the first etalon function unit 43 and the second etalon function unit 44 include a waveguide tapered area, a cavity surface etching groove, and a resonant cavity area. The waveguide tapered area performs beam expansion on incident light; the cavity surface etching groove forms a reflective surface, and the incident light generates reflection between two cavity surface etching grooves; and the resonant cavity area forms an FP (Fabry-Perot) cavity, and the incident light generates constructive (or destructive) interference within the resonant cavity area. The first photoelectric detector 45, the second photoelectric detector 46, the third photoelectric detector 47, and the fourth photoelectric detector 48 have an optical-to-electrical conversion function, and may be specifically photodiodes or phototriodes. Signal light is incident to the first optical waveguide 41, and local oscillator light is incident to the second optical waveguide 42. The first optical waveguide 41 splits the signal light into two beams. One beam of the signal light is received by the first photoelectric detector 45 after passing through the first etalon function unit 43, and converted into an electrical signal, so that a current intensity value $I_{PD1}$ is obtained; and the other beam of the signal light is directly received by the second photoelectric detector 46, and converted into an electrical signal, so that a current intensity value $I_{PD2}$ is obtained. One beam of the local oscillator light is received by the third photoelectric detector 47 after passing through the second etalon function unit 44, and converted into an electrical signal, so that a current intensity value $I_{PD3}$ is obtained; and the other beam of the local oscillator light is directly received by the fourth photoelectric detector 48, and converted into an electrical signal, so that a current intensity value $I_{PD4}$ is obtained.

Figure 5:
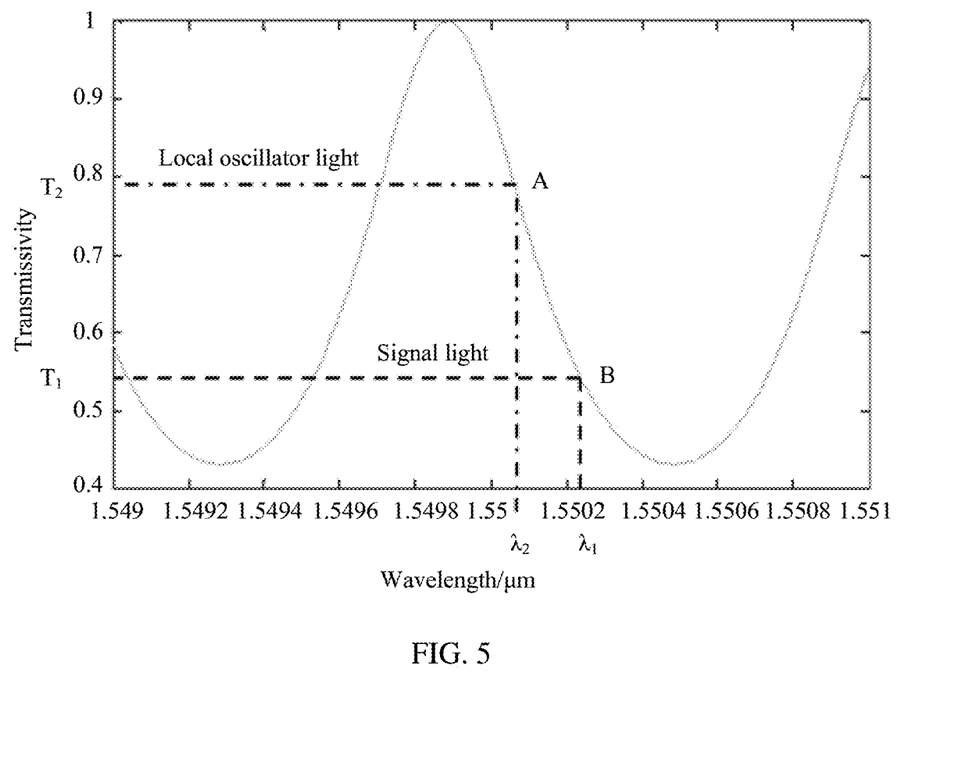
FIG. 5 is an etalon spectral transmission curve graph used to implement an embodiment of the present disclosure.

FIG. 5 is an etalon spectral transmission curve graph according to an embodiment of the present disclosure. Specifically, the etalon 33 in FIG. 3, and the first etalon function unit 43 and the second etalon function unit 44 that are in FIG. 4 may have the spectral transmission curve graph shown in FIG. 5. The etalon may be an air type etalon. A shape of a spectral transmission curve of the air type etalon depends on a distance between flat glass reflection surfaces and reflectivity. The distance between the flat glass reflection surfaces determines a free spectral range, that is, an interval between two adjacent peak points on the curve in FIG. 5. The reflectivity of the flat glass determines steepness of the curve. The etalon may be a waveguide type etalon. A shape of a spectral transmission curve of the waveguide type etalon depends on a length of the resonant cavity area and reflectivity of the cavity surface etching groove. The length of the resonant cavity area determines a free spectral range, that is, an interval between two adjacent peak points on the curve in FIG. 5. The reflectivity of the cavity surface etching groove determines steepness of the curve. Transmissivity of the etalon is obtained by using the following formula:

$$T = \frac{1}{1 + F * \sin\left(\frac{\Delta}{2}\right)^2}, \text{ where}$$

$$\Delta = \frac{2 * \pi}{\lambda * 2 * L}, F = \frac{4 * r}{1 - r^2}, \text{ and } r = 1 - T;$$

$\lambda$ is a wavelength of a light wave that is incident to the etalon, L is a distance between the flat glass reflection surfaces of the etalon or a length of the resonant cavity area, and r is reflectivity of the flat glass reflection surface of the etalon or reflectivity of the cavity surface etching groove.

In a specific implementation process, wavelengths of the signal light and the local oscillator light may be respectively located at two points A and B on the spectral curve in FIG. 5. Transmissivity of the signal light and transmissivity of the local oscillator light are different, and may be calculated by using a current intensity value measured by a photoelectric detector.

The transmissivity of the signal light is obtained by using the following formula:

$$T_1 = I_{PD1}/I_{PD2}.$$

The transmissivity of the local oscillator light is obtained by using the following formula:

$$T_2 = I_{PD3}/I_{PD4}.$$

It may be learned from the foregoing formulas and the etalon spectral transmission curve graph in FIG. 5 that the frequency offset estimation unit 28 sets the wavelength values of the signal light and the local oscillator light to a linear or logarithmic linear middle part of the etalon spectral transmission curve by using a control circuit. In this way, a linear response change signal of the transmissivity T is obtained regardless of a specific drift direction of the wavelength $\lambda$. The transmissivity T generated when the signal light or the local oscillator light passes through the etalon and the wavelength $\lambda$ of the signal light or local oscillator light are in a one-to-one correspondence.

The frequency offset estimation unit 28 outputs, to the frequency offset compensation unit 29, a feedback signal that reflects a frequency offset value between the signal light and the local oscillator light. Specifically, the feedback signal that reflects the frequency offset value between the signal light and the local oscillator light and that is output by the frequency offset estimation unit 28 includes current intensity values $I_{PD1}$, $I_{PD2}$, $I_{PD3}$, and $I_{PD4}$ that are respectively output by a first photoelectric detector (34 or 45), a second photoelectric detector (35 or 46), a third photoelectric detector (36 or 47), and a fourth photoelectric detector (37 or 48). The frequency offset compensation unit 29 specifically includes two implementations:

One implementation is as follows: The frequency offset compensation unit 29 performs the following steps, so that the frequency offset value between the local oscillator light and the signal light meets a system requirement: obtaining $I_{PD1}$, $I_{PD2}$, $I_{PD3}$, and $I_{PD4}$ from the frequency offset estimation unit 28; separately calculating ratios of $I_{PD1}/I_{PD2}$ and $I_{PD1}/I_{PD4}$; then calculating a difference $\Delta$ of $I_{PD1}/I_{PD2} - I_{PD3}/I_{PD4}$; further obtaining the wavelength of the signal light because the transmissivity of the signal light may be obtained according to $I_{PD1}/I_{PD2}$; and further obtaining the wavelength of the local oscillator light because the transmissivity of the local oscillator light may be obtained according to $I_{PD3}/I_{PD4}$. The difference $\Delta$ indicates the frequency offset value between the signal light and the local oscillator light. A control signal is generated according to a magnitude and a direction of the difference $\Delta$, so as to perform wavelength adjustment on the local oscillator laser 23. A wavelength adjustment process is generally divided into two steps: coarse adjustment and fine adjustment. In an initial stage, the difference $\Delta$ is relatively large, and the wavelength difference between the signal light and the local oscillator light is relatively large. In this case, the coarse adjustment is performed. When the difference $\Delta$ becomes smaller, and the wavelength difference between the signal light and the local oscillator light becomes smaller, the fine adjustment is performed. The adjustment process is not completed until the frequency offset value between the signal light and the local oscillator light meets the system requirement.

The other implementation is as follows: The frequency offset compensation unit 29 performs the following steps, so as to perform coarse adjustment on the frequency offset value between the signal light and the local oscillator light: obtaining $I_{PD1}$, $I_{PD2}$, $I_{PD3}$, and $I_{PD4}$ from the frequency offset estimation unit 28; separately calculating ratios of $I_{PD1}/I_{PD2}$ and $I_{PD3}/I_{PD4}$; then calculating a difference $\Delta$ of $I_{PD1}/I_{PD2} - I_{PD3}/I_{PD4}$; further obtaining the wavelength of the signal light because the transmissivity of the signal light may be obtained according to $I_{PD1}/I_{PD2}$; and further obtaining the wavelength of the local oscillator light because the transmissivity of the local oscillator light may be obtained according to $I_{PD3}/I_{PD4}$. The difference $\Delta$ indicates the frequency offset value between the signal light and the local oscillator light. A control signal is generated according to a magnitude and a direction of the difference $\Delta$, so as to perform wavelength adjustment on the local oscillator laser 23, until the frequency offset value between the signal light and the local oscillator light is less than +/−5 GHz, that is, the wavelength difference between the signal light and the local oscillator light is approximately 0.04 nm, and falls within a range of a compensation capability of a DSP. Then the DSP further calculates the frequency offset value between the signal light and the local oscillator light, and generates a control signal according to a magnitude and a direction of the frequency offset value between the signal light and the local oscillator light, so as to perform fine adjustment on the local oscillator laser 23, so that the frequency offset value between the signal light and the local oscillator light meets the system requirement.

In this embodiment, in a coherent receiver, signal light and local oscillator light pass through a frequency offset estimation unit, so that a feedback signal that reflects a frequency offset value between the signal light and the local oscillator light is obtained; a frequency offset compensation unit obtains the frequency offset value between the signal light and the local oscillator light according to the feedback signal, and performs wavelength adjustment on a local oscillator laser according to the frequency offset value, so that the frequency offset value between the signal light and the local oscillator light meets a system requirement, thereby implementing frequency offset estimation and compensation for signal light and local oscillator light in a coherent system when a laser without a wavelength locker is used as a light source of the signal light and the local oscillator light, and reducing costs of the coherent system.

Figure 6:
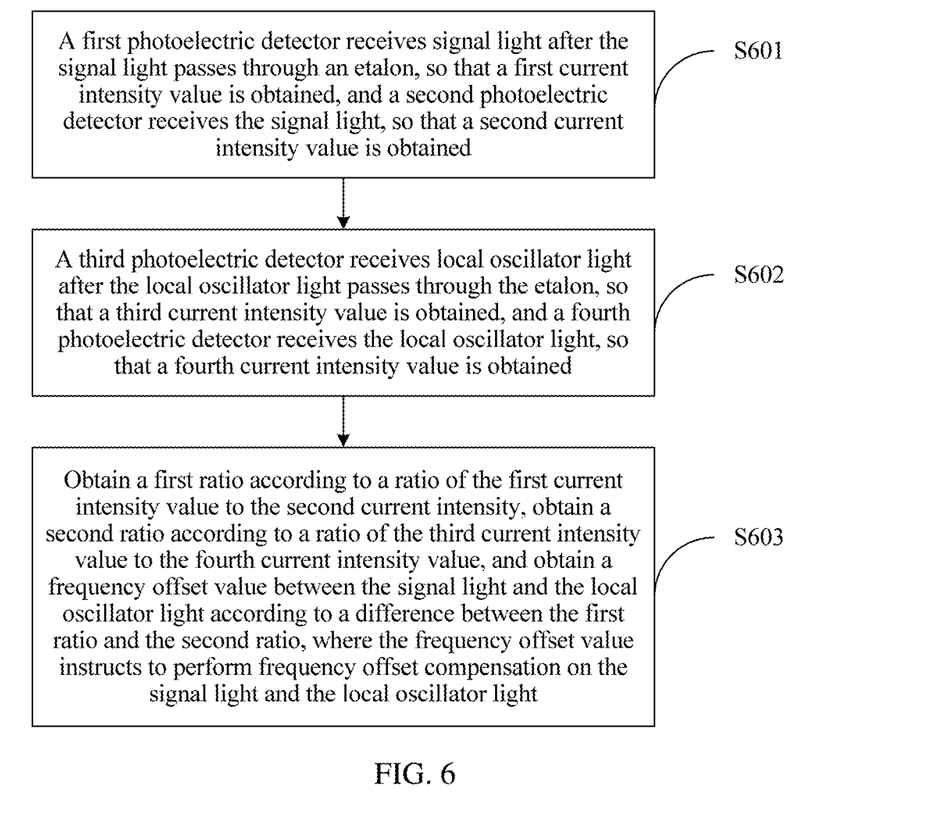
FIG. 6 is a demonstrative flowchart of a method for frequency offset estimation and compensation used to implement an embodiment of the present disclosure.

FIG. 6 is a demonstrative flowchart of a method for coherent light source frequency offset estimation and compensation according to an embodiment of the present disclosure. Specifically, the method may be performed by a coherent receiver. The coherent receiver may include a frequency offset estimation unit and a frequency offset compensation unit. The method specifically includes the following steps.

S601: A first photoelectric detector receives signal light after the signal light passes through an etalon, and a first current intensity value is obtained; a second photoelectric detector receives the signal light, and a second current intensity value is obtained.

S601 may be performed by the frequency offset estimation unit. Specifically, the frequency offset estimation unit includes the etalon. In a specific implementation process, when the etalon may be an air type etalon, the signal light is split into two parts by a first beamsplitter before passing through the etalon. One part of the signal light is received by the first photoelectric detector after passing through the etalon, and the first current intensity value is obtained; and the other part of the signal light is directly received by the second photoelectric detector without passing through the etalon, and the second current intensity value is obtained. Optionally, the first beamsplitter may be replaced by a first optical waveguide. In this case, the etalon may be a waveguide type etalon.

S602: A third photoelectric detector receives local oscillator light after the local oscillator light passes through the etalon, and a third current intensity value is obtained, and a fourth photoelectric detector receives the local oscillator light, and a fourth current intensity value is obtained.

S602 may be performed by the frequency offset estimation unit. In a specific implementation process, when the etalon may be an air type etalon, the etalon passed through by the local oscillator light and the etalon passed through by the signal light are the same etalon. The local oscillator light is split into two parts by a second beamsplitter before passing through the etalon. One part of the local oscillator light is received by the third photoelectric detector after passing through the etalon, and the third current intensity value is obtained; and the other part of the signal light is directly received by the fourth photoelectric detector without passing through the etalon, and the fourth current intensity value is obtained. Optionally, the second beamsplitter may be replaced by a second optical waveguide. In this case, the etalon may be a waveguide type etalon, and has a spectral transmission curve same as that of the etalon in S601.

S603: Obtain a first ratio according to a ratio of the first current intensity value to the second current intensity, obtain a second ratio according to a ratio of the third current intensity value to the fourth current intensity value, and obtain a frequency offset value between the signal light and the local oscillator light according to a difference between the first ratio and the second ratio, where the frequency offset value instructs to perform frequency offset compensation on the signal light and the local oscillator light.

S603 may be performed by the frequency offset compensation unit. Specifically, the first ratio is obtained according to the ratio of the first current intensity value to the second current intensity, and the second ratio is obtained according to the ratio of the third current intensity value to the fourth current intensity. Because transmissivity of the signal light in the etalon may be obtained according to the first ratio, so as to obtain a wavelength of the signal light, and transmissivity of the local oscillator light in the etalon may be obtained according to the second ratio, so as to obtain a wavelength of the local oscillator light, the difference between the first ratio and the second ratio indicates the frequency offset value between the signal light and the local oscillator light. Further, the frequency offset compensation unit performs, according to the frequency offset value between the signal light and the local oscillator light, wavelength adjustment on a laser that generates the local oscillator light, so as to compensate the frequency offset value between the local oscillator light and the signal light, until the frequency offset value between the signal light and the local oscillator light meets a system requirement. Optionally, the frequency offset compensation unit may perform coarse adjustment on the wavelength of the local oscillator light, so that the frequency offset value between the signal light and the local oscillator light is less than +/−5 GHz, and the wavelength difference between the signal light and the local oscillator light is approximately 0.04 nm, and falls within a range of a compensation capability of a DSP. Then the DSP further performs fine adjustment on the wavelength of the local oscillator light, so that the frequency offset value between the signal light and the local oscillator light meets the system requirement.

In this embodiment, in a coherent receiver, signal light and local oscillator light pass through a frequency offset estimation unit, so that a feedback signal that reflects a frequency offset value between the signal light and the local oscillator light is obtained; a frequency offset compensation unit obtains the frequency offset value between the signal light and the local oscillator light according to the feedback signal, and performs wavelength adjustment on a local oscillator laser according to the frequency offset value, so that the frequency offset value between the signal light and the local oscillator light meets a system requirement, thereby implementing frequency offset estimation and compensation for signal light and local oscillator light in a coherent system when a laser without a wavelength locker is used as a light source of the signal light and the local oscillator light, and reducing costs of the coherent system.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The foregoing are merely example embodiments of the present disclosure. A person skilled in the art may make various modifications and variations to the present disclosure without departing from the spirit and scope of the present disclosure.

What is claimed is:

1. A coherent receiver, comprising:
a frequency offset estimation unit configured to:
receive signal light, wherein the signal light is received by a first photoelectric detector after passing through an etalon and a first intensity value is obtained, and the signal light is received by a second photoelectric detector and a second intensity value is obtained; and receive local oscillator light, wherein the local oscillator light is received by a third photoelectric detector after passing through the etalon and a third intensity value is obtained and the local oscillator light is received by a fourth photoelectric detector and a fourth intensity value is obtained; and a frequency offset compensation unit in communication with the frequency offset estimation unit, the frequency offset compensation unit configured to:
  obtain a first ratio of the first intensity value to the second intensity value;
  obtain a second ratio of the third intensity value to the fourth intensity value;
  obtain a frequency offset value between the signal light and the local oscillator light according to a difference between the first ratio and the second ratio; and
  perform frequency offset compensation on the signal light and the local oscillator light.

2. The coherent receiver according to claim 1, wherein the etalon comprises an air type etalon or a waveguide type etalon.

3. The coherent receiver according to claim 1, wherein the frequency offset estimation unit further comprises:
  a first beamsplitter configured to split the signal light into two parts, one part of the signal light is received by the first photoelectric detector after passing through the etalon, and a second part of the signal light is received by the second photoelectric detector; and
  a second beamsplitter configured to split the local oscillator light into two parts, one part of the local oscillator light is received by the third photoelectric detector after passing through the etalon, and a second part of the local oscillator light is received by the fourth photoelectric detector.

4. The coherent receiver according to claim 1, wherein the frequency offset estimation unit further comprises:
  a first optical waveguide configured to split the signal light into two parts, one part of the signal light is received by the first photoelectric detector after passing through the etalon, and a second part of the signal light is received by the second photoelectric detector; and
  a second optical waveguide configured to split the local oscillator light into two parts, one part of the local oscillator light is received by the third photoelectric detector after passing through the etalon, and a second part of the local oscillator light is received by the fourth photoelectric detector.

5. The coherent receiver according to claim 1, wherein the frequency offset compensation unit is further configured to perform wavelength adjustment on the local oscillator light according to the frequency offset value to compensate the frequency offset value between the local oscillator light and the signal light.

6. A method for coherent light source frequency offset estimation and compensation; the method comprising:
  receiving, by a first photoelectric detector, signal light after the signal light passes through an etalon and generating a first intensity value;
  receiving, by a second photoelectric detector, the signal light and generating a second intensity value;
  receiving, by a third photoelectric detector, local oscillator light after the local oscillator light passes through the etalon and generating a third intensity value;
  receiving, by a fourth photoelectric detector, the local oscillator light and generating a fourth intensity value;
  obtaining a first ratio of the first intensity value to the second intensity value, obtaining a second ratio of the third intensity value to the fourth intensity value, and obtaining a frequency offset value between the signal light and the local oscillator light according to a difference between the first ratio and the second ratio; and
  performing frequency offset compensation on the signal light and the local oscillator light.

7. The method according to claim 6, wherein the etalon comprises an air type etalon or a waveguide type etalon.

8. The method according to claim 6, wherein;
  before the signal light passes through the etalon, the method further comprises:
    splitting, by a first beamsplitter, the signal light into two parts, wherein one part of the signal light is received by the first photoelectric detector after passing through the etalon, and a second part of the signal light is received by the second photoelectric detector; and before the local oscillator light passes through the etalon, the method further comprises:
  splitting, by a second beamsplitter, the local oscillator light into two parts, wherein one part of the local oscillator light is received by the third photoelectric detector after passing through the etalon, and a second part of the local oscillator light is received by the fourth photoelectric detector.

9. The method according to claim 6, wherein:
  before the signal light passes through the etalon, the method further comprises:
    splitting, by a first optical waveguide, the signal light into two parts, wherein one part of the signal light is received by the first photoelectric detector after passing through the etalon, and a second, part of the signal light is received by the second photoelectric detector; and before the local oscillator light passes through the etalon, the method further comprises:
    splitting, by a second optical waveguide, the local oscillator light into two parts, wherein one part of the local oscillator light is received by the third photoelectric detector after passing through the etalon, and a second part of the local oscillator light is received by the fourth photoelectric detector.

10. The method according to claim 6, wherein after obtaining the frequency offset value between the signal light and the local oscillator light according to the difference between the first ratio and the second ratio, the method further comprises;
  performing wavelength adjustment on the local oscillator light according to the frequency offset value to compensate the frequency offset value between the local oscillator light and the signal light.

11. A coherent optical receiving system, comprising:
  a coherent transmitter; and
  a coherent receiver comprising:
    a frequency offset estimation unit configured to:
      receive signal light, wherein the signal light is received by a first photoelectric detector after passing through an etalon and a first intensity value is obtained; and the signal light is received by a second photoelectric detector and a second intensity value is obtained; and
      receive local oscillator light, wherein the local oscillator light is received by a third photoelectric detector after passing through the etalon and a third intensity value is obtained, and the local oscillator light is received by a fourth photoelectric detector and a fourth intensity value is obtained; and a frequency offset compensation unit in communication with the frequency offset estimation unit, the frequency offset compensation unit configured to:
  obtain a first ratio of the first intensity value to the second intensity value;
  obtain a second ratio of the third intensity value to the fourth intensity value;
  obtain a frequency offset value between the signal light and the local oscillator light according to a difference between the first ratio and the second ratio; and
  perform frequency offset compensation on the signal light and the local oscillator light.

* * * * *